US009349004B2

(12) United States Patent
Bank et al.

(10) Patent No.: US 9,349,004 B2
(45) Date of Patent: May 24, 2016

(54) PREDICTING THE ACTIONS AND EVALUATING THE RISK OF A SOFTWARE INSTALL PROGRAM

(71) Applicant: International Business Machines Corporation, Armonk, NY (US)

(72) Inventors: Judith H. Bank, Cary, NC (US); Liam Harpur, Dublin (IE); Ruthie D. Lyle, Durham, NC (US); Patrick J. O'Sullivan, Dublin (IE); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 31 days.

(21) Appl. No.: 14/096,085

(22) Filed: Dec. 4, 2013

(65) Prior Publication Data

US 2015/0154397 A1    Jun. 4, 2015

(51) Int. Cl.
*G06F 21/56* (2013.01)
*G06F 9/445* (2006.01)
*G06F 21/57* (2013.01)

(52) U.S. Cl.
CPC *G06F 21/56* (2013.01); *G06F 8/61* (2013.01); *G06F 21/563* (2013.01); *G06F 21/577* (2013.01)

(58) Field of Classification Search
CPC ............. G06F 21/56; G06F 8/61; G06F 8/65; G06F 69/329; G06F 67/306

USPC .............................................. 726/1–4, 22–26
See application file for complete search history.

(56) References Cited

U.S. PATENT DOCUMENTS

| 7,191,435 | B2 | 3/2007 | Lau et al. |
| 2003/0229890 | A1* | 12/2003 | Lau et al. ...................... 717/168 |
| 2005/0120242 | A1* | 6/2005 | Mayer et al. .................. 713/201 |
| 2011/0029946 | A1 | 2/2011 | Joukov et al. |

OTHER PUBLICATIONS

"DLL Hell," Wikipedia, <http://en.wikipedia.org/wiki/Dll_hell>, Oct. 23, 2013.

* cited by examiner

*Primary Examiner* — Amir Mehrmanesh
(74) *Attorney, Agent, or Firm* — Thomas E. Tyson; Gregory K. Goshorn; Greg Goshorn, P.C.

(57) ABSTRACT

Provided are techniques for predicting the actions and evaluating the risk of a software install program including downloading a software installation program on a computing system, wherein execution of the software installation program installs a computing product on the computing system; disassembling the software installation program to produce a plurality of lines of instructions; analyzing each line of the plurality of lines or instructions to identify potential modifications to the computing system associated with the program; generating a report detailing the potential modifications to the computing system; and displaying the report so that a user may evaluate an impact of the potential modifications to the computing system in the event the software installation program is executed.

17 Claims, 6 Drawing Sheets

PREDICTING THE ACTIONS AND EVALUATING THE RISK OF A SOFTWARE INSTALL PROGRAM

FIELD OF DISCLOSURE

The claimed subject matter relates generally to the installation of software and, more specifically, to techniques for predicting the actions and evaluating the risk of a software install program.

BACKGROUND OF THE INVENTION

There are numerous situations in which computer users are unsure whether or not to install new programs, updates, or plugins that are presented for their selection and approval. Initializing an existing application installed on the computer may cause a notification (message box) to appear advising that a new tool bar or update is available for the application. These notifications may also be sent based on the availability of new software updates from the software provider, even if the user is not accessing the application at the time. Further, users may read articles and blogs advising them to try new programs and tools.

Often the decision to install one of the aforementioned executable packages results in modifications to the computer system that cannot easily be undone. This is especially prevalent with antivirus programs. Many cannot be totally removed and, even if uninstalled, may leave behind remnants that must be extracted manually. Often these vestiges cannot be eliminated without extreme actions. Achieving a 'clean' uninstall may require skills that ordinary users do not possess, such as updating the windows registry, finding and deleting related files in unknown directories, modifying pointers, modifying system parameters, removing processes from start lists and so on.

Sometimes the necessary files cannot be deleted because they appear to the operating system that another application is using them. There may be a dynamic link library (dll) version conflict, such that application A is using version 1.1 dll and application B wants to install version 1.2. Installing the new version, 1.2, might render program A inoperable because the interface or parameters have changed. Furthermore, this may not be discovered until the installation has partially completed and the computer is already damaged because modifications have already been made to the software environment. If one the above scenarios occurs, it may not be possible to install a new or different program of the same type (e.g. antivirus package) because the new version detects the remnants of the old software package and proceeds as if the old package is still present or the installation fails in the middle because the required dll cannot be replaced with a newer version.

SUMMARY

Provided are techniques for predicting the actions and evaluating the risk of a software install program. The techniques include downloading a software installation program on a computing system, wherein execution of the software installation program installs a computing product on the computing system; disassembling the software installation program to produce a plurality of lines of instructions; analyzing each line of the plurality of lines or instructions to identify potential modifications to the computing system associated with the program; generating a report detailing the potential modifications to the computing system; and displaying the report so that a user may evaluate an impact of the potential modifications to the computing system in the event the software installation program is executed.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
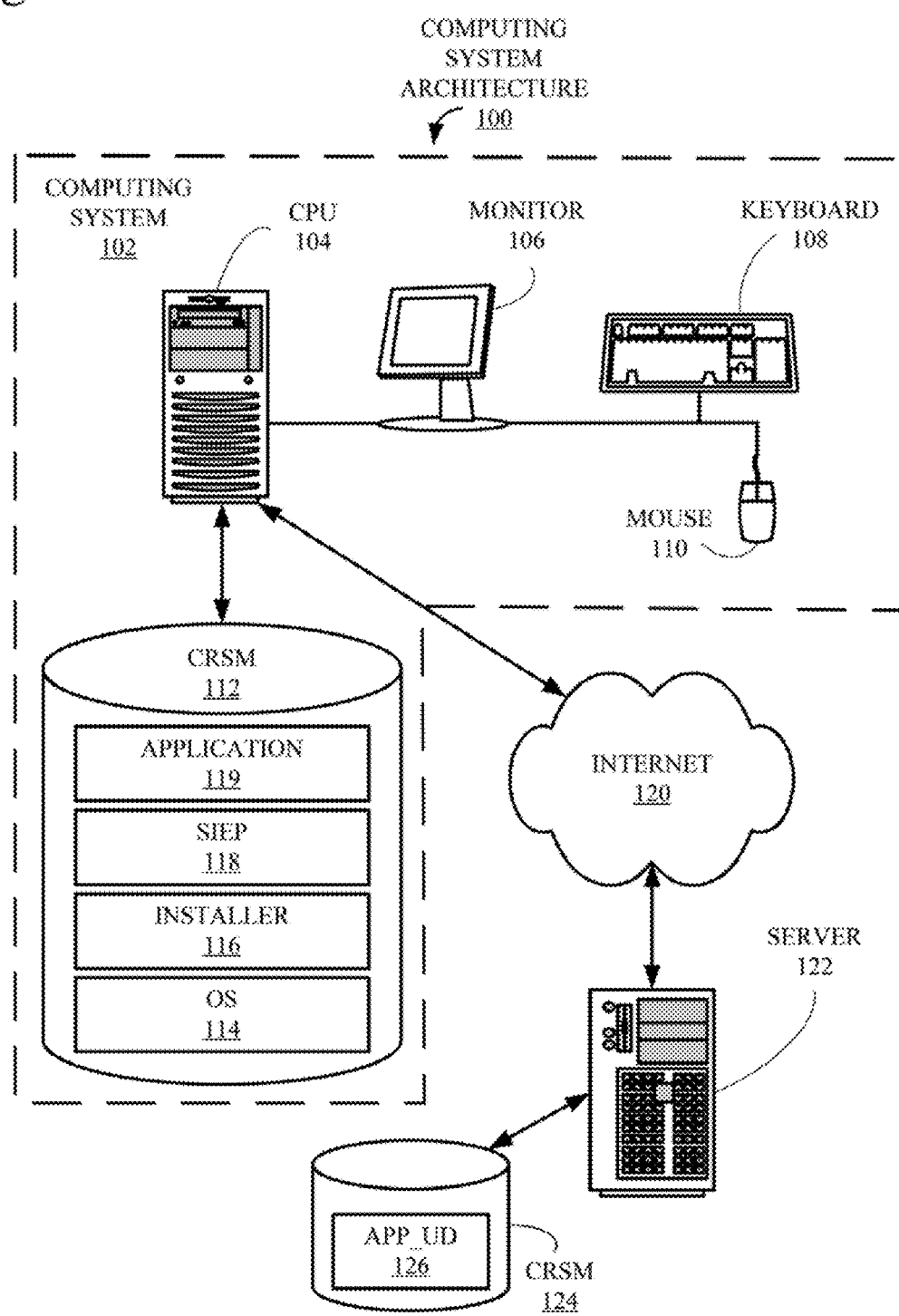
FIG. 1 is a computing system architecture that may implement the claimed subject matter.

As the Inventors herein have realized, a decision to install an executable package may result in modifications to the computer system that cannot easily be undone, especially with respect to antivirus programs. What is needed are techniques that enable a user to evaluate, prior to a particular software installation, or "install," the potential effect that the install may have on a computing system so that a decision to proceed can be made. In addition, achieving a 'clean' uninstall may require skills that ordinary users do not possess, such as updating the windows registry, finding and deleting related files in unknown directories, modifying pointers, modifying system parameters, removing processes from start lists and so on. An evaluation on effects of an install may reduce the difficulty of an "uninstall" should that become necessary.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer(for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to the figures, FIG. 1 is a block diagram of one example of a computing system architecture 100 that may incorporate the claimed subject matter. A computing system 102 includes a central processing unit (CPU) 104, coupled to a monitor 106, a keyboard 108 and a pointing device, or "mouse," 110, which together facilitate human interaction with elements of architecture 100 and client system 102. Also included in computing system 102 and attached to CPU 104 is a computer-readable storage medium (CRSM) 112, which may either be incorporated into computing system 102 i.e. an internal device, or attached externally to CPU 104 by means of various, commonly available connection devices such as but not limited to, a universal serial bus (USB) port (not shown). CRSM 112 is illustrated storing an operating system (OS) 114, an installer 116, a Software Install Evaluation Program (SIEP) 118 and a computer software application 119. In the following examples, SIEP 118 incorporates the claimed subject matter and installer 116 and application 119 are used as examples of programs that may be impacted by SIEP 118. SIEP 118 is described in more detail below in conjunction with FIGS. 2-6.

Computing system 102 and CPU 104 are connected to the Internet 120, which is also connected to a server computer, or simply "server," 122. Although in this example, computing system 102 and server 122 are communicatively coupled via the Internet 120, they could also be coupled through any number of communication mediums such as, but not limited to, a local area network (LAN) (not shown). Server 122 is coupled to a CRSM 124, which is illustrated as storing an update to application 119, i.e. an app_ud 126. App_ud 126 is used as an example of a software update or upgrade that may be handled in accordance with the disclosed technology. It should be noted that, in addition to updates and upgrades, the claimed subject matter is equally applicable to an initial installation and that, in addition to applications, is applicable to other types of software including, but not limited to, programs, plugin modules or other software. Further, it should be noted there are many possible computing system configurations, of which computing architecture 100 is only one simple example.

Figure 2:
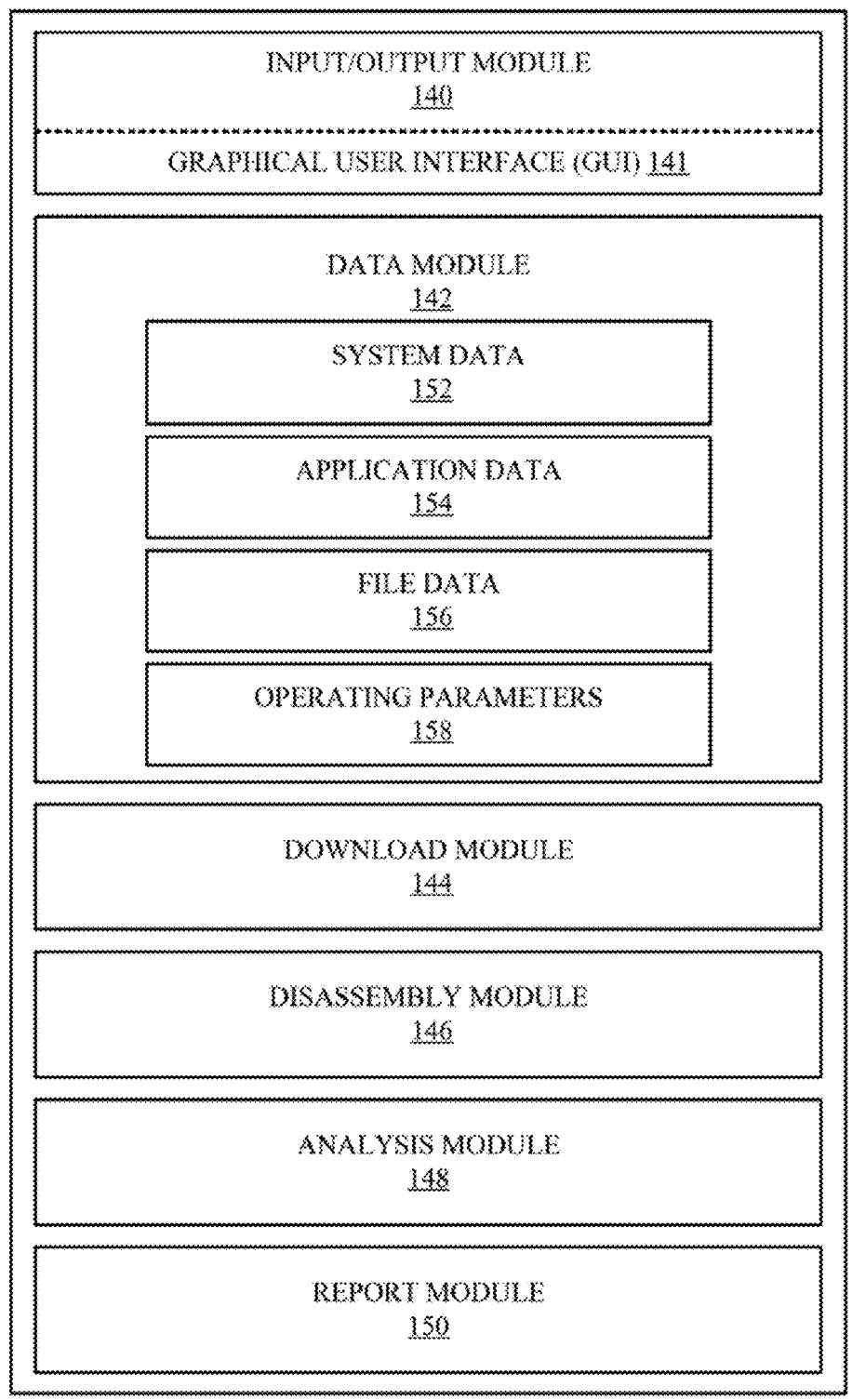
FIG. 2 is a block diagram of a Software Install Evaluation Program (SIEP) that may implement the claimed subject matter.

FIG. 2 is a block diagram of SIEP 118, introduced above in FIG. 1, in greater detail. SIEP 118 includes an input/output (I/O) module 140, which includes a graphical user interface (GUI) 141, a data module 142, a download module 144, a disassembly module 146, an analysis module 148 and a report module 150. For the sake of the following examples, logic associated with SIEP 118 is assumed to be stored on CRSM 112 (FIG. 1) and execute on one or more processors (not shown) of CPU 104 (FIG. 1) of computing system 102 (FIG. 1). It should be understood that although shown on computing system 102, the claimed subject matter may be stored and executed remotely on a server such as server 122. Further, it should be understood that the claimed subject matter can be implemented in many types of computing systems and data storage structures but, for the sake of simplicity, is described only in terms of computing system 102 and architecture 100 (FIG. 1). In addition, the representation of SIEP 118 in FIG. 2 is a logical model. In other words, components 140, 142, 144, 146, 148 and 150 may be stored in the same or separate files and loaded and/or executed within system 100 either as a single system or as separate processes interacting via any available inter process communication (IPC) techniques.

I/O module 140 handles any communication SIEP 118 has with other components of system 100. GUI 141 enables users of SIEP 118 to interact with and to define the desired functionality of SIEP 118. Data module 142 is a data repository for information that SIEP 118 requires during normal operation. Examples of the types of information stored in data module 142 include system data 152, application data 154, file data 156 and operating parameters 158.

System data 152 stores information concerning computing system 102, including, but not limited to, the identity and configuration information on associated devices and any corresponding device drivers. Application data 154 stores information on applications (not shown) installed on computing system 102. Such information may include, but is not limited to the name, dependencies, files, including dynamic link libraries (DDLs) associated with the applications, corresponding registry keys, so on. File data 156 stores information related to files (not shown) on computing system 102 that might be impacted by a software install, including, but not limited to, configuration and backup files. Operating parameters 158 includes information on various administrative preferences that have been set including parameters that control the look and feel of SIEP 118 and designate levels of analysis and restoration that may be implemented.

Download module 144 is responsible for downloading an identified software installation program in a manner that does not adversely impact computing system 102. Such responsibilities include creating a temporary space to store the software installation program. It should be noted that many such programs have default spaces to which they attempt to install and that download module 144 might override such defaults.

Disassembly module 146 includes logic for disassembling the software installation program downloaded by download module 144. Disassembly typically involves breaking the software installation program into discrete lines that may be individually examined. Analysis module 148 is responsible for analyzing each line of the software installation program. Report module 150 collects the information on each line generated by analysis module 148 and generates a report so that a user may evaluate a risk associated with the potential program installation, report module 150 may also generate a report that provides support and instructions for de-installing any software installed by the software installation program. Components 142, 144, 146, 148, 150, 152, 154, 156 and 158 are described in more detail below in conjunction with FIGS. 3-6.

Figure 3:
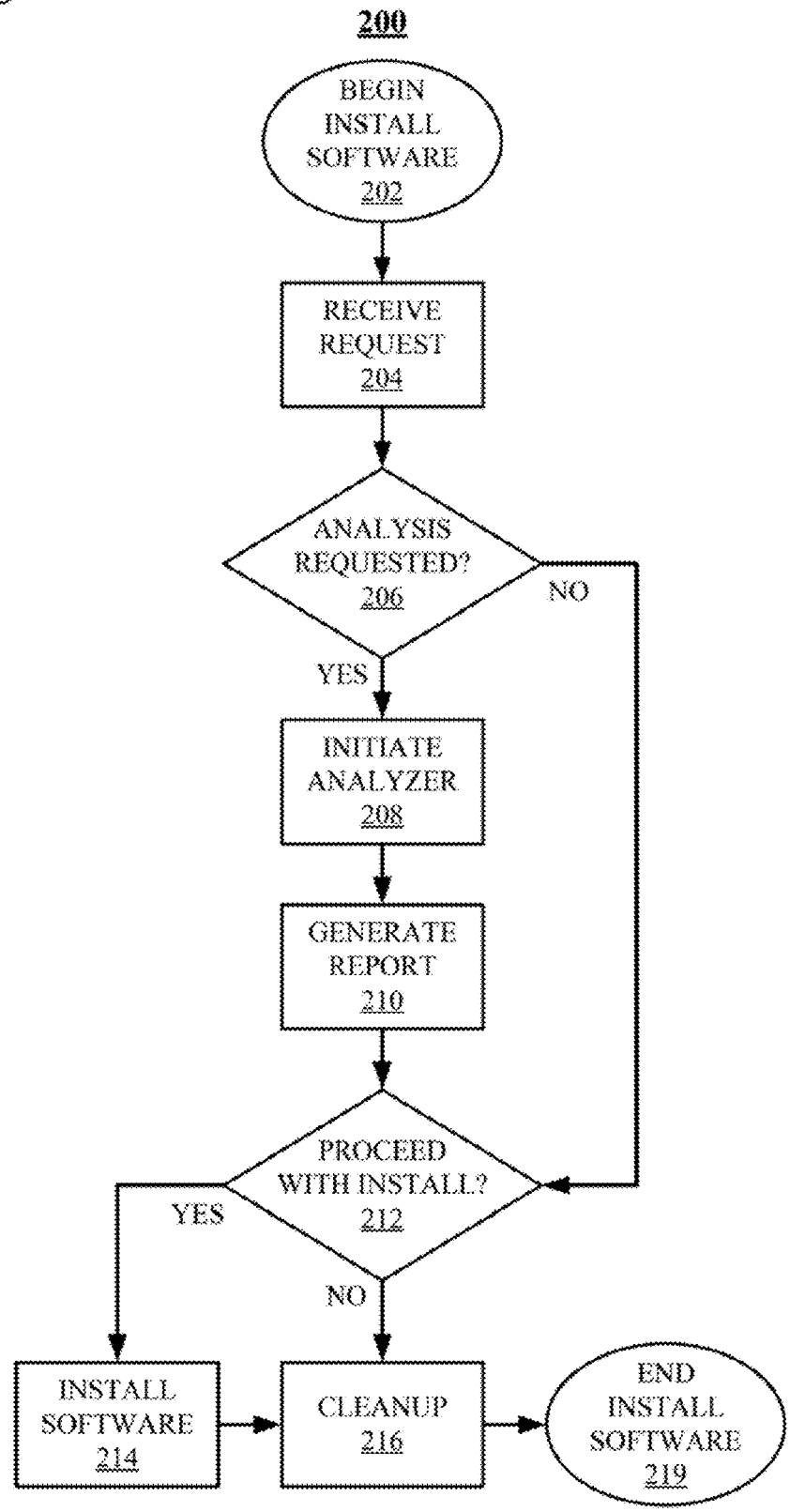
FIG. 3 is a flowchart of one example of an Install Software process that may implement aspects of the claimed subject matter.

FIG. 3 is a flowchart of one example of an Install Software process 200 that may implement aspects of the claimed subject matter. In this example, logic associated with process 200 is stored on CRSM 112 (FIG. 1) as part of SIEP 118 (FIGS. 1 and 2) and execute on one or more processors (not shown) of CPU 104 (FIG. 1) of computing system 102 (FIG. 1).

Process 200 starts in a "Begin Install Software" block 202 and proceeds immediately to a "Receive Request" block 204. During processing associated with block 204, a request to download and install software is received. Such a request may by initiated by a user or automatically by various installed update programs. During processing associated with an "Analysis Requested?" block 206, a determination is made as to whether or not an analysis is requested. A request to analyze a software installation program may be generated on a case-by-case basis or automatic for all software installations and updates. In addition, information may be stored in data module 142 (FIG. 2) that specifies case-by-case or delimit analysis, with specific applications automatically either triggering or exempted from analysis, respectively.

If a determination is made that analysis is requested, control proceeds to an "Initiate Analyzer" block 208. During processing associated with block 208, an analysis of the software installation program for which a request was received during processing associated with block 204 is initiated (see 250, FIG. 4). During processing associated with a "Generate Report" block 210, a report that includes the result of the analysis performed during processing associated with block 208 is generated and displayed to the user.

During processing associated with a "Proceed With Install?" block 212, GUI 148 (FIG. 2) provides the user with the opportunity to accept or decline the potential install. If the user decides to continue with the install, control proceeds to an "Install Software" block 214. During processing associated with block 214, the software for which the request was received is installed by executing the software installation program that has been analyzed. One the software has been installed or, if during processing associated with block 212, a determination has been made that the software is not to be installed, control proceeds to a "Cleanup" block 216. During processing associated with block 216, and temporary resources associated with process 200, such as temporary files and memory spaces are released. Finally, control proceeds to an "End Install Software" block 219 during which process 200 is complete.

Figure 4:
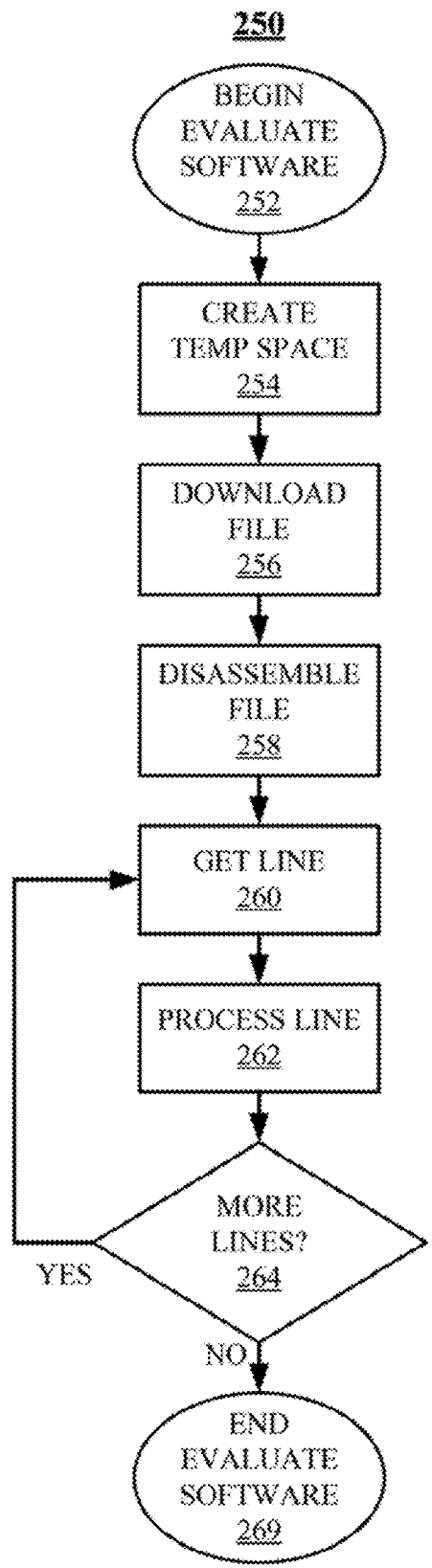
FIG. 4 is a flowchart of one example of an Evaluate Software process that may implement aspects of the claimed subject matter.

FIG. 4 is a flowchart of one example of an Evaluate Software process 250 that may implement aspects of the claimed subject matter. In this example, like process 200, logic associated with process 250 is stored on CRSM 112 (FIG. 1) as part of SIEP 118 (FIGS. 1 and 2) and execute on one or more processors (not shown of CPU 104 (FIG. 1) of computing system 102 (FIG. 1).

Process 250 starts in a "Begin Evaluate Software" block 252 and proceeds immediately to a "Create Temp Space" block 254. During processing associated with block 254, temporary memory space, which in this example is on CRSM 112, is allocated for the software installation program that is to be analyzed. It should be noted that many such installation programs specify a particular download location and that process 250 may use or override that particular location. During processing associated with a "Download File" block 256, the software installation program is downloaded to the temporary space allocated during processing associated with block 254.

During processing associated with a "Disassemble File" block 258, the program downloaded during processing associated with block 254 is disassembled. In other words, individual lines within the file are marked for processing as discrete lines. During processing associated with a "Get Line" block 260, a first of the discrete lines is selected for processing. During processing associated with a "Process Line" block 262, the line selected during processing associated with block 260 is analyzed (see 300, FIG. 5).

During processing associated with a "More Lines?" block 264, a determination is made as to whether or not there are more lines to be processed. If so, control returns to Get Line block 260, an unprocessed line is selected and processing continues as described above. If not, control proceeds to an "End Evaluate Software" block 269 during which process 250 is complete.

Figure 5:
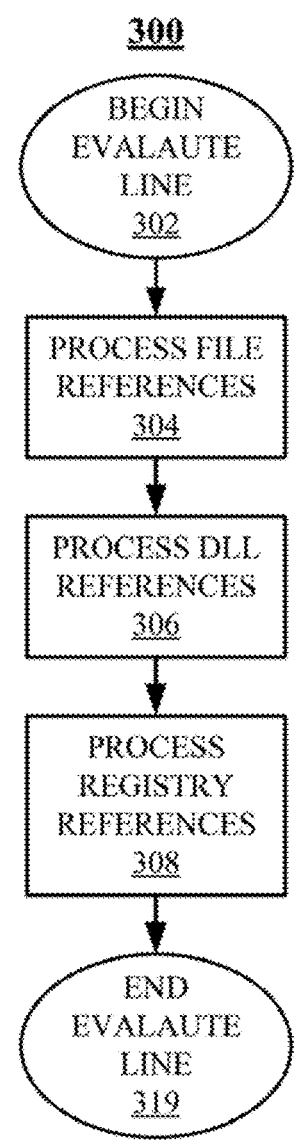
FIG. 5 is a flowchart on one example of an Evaluate Line process that may implement aspects of the claimed subject matter.

FIG. 5 is a flowchart on one example of an Evaluate Line process 300 that may implement aspects of the claimed subject matter. In this example, like processes 200 and 250, logic associated with process 300 is stored on CRSM 112 (FIG. 1) as part of SIEP 118 (FIGS. 1 and 2) and execute on one or more processors (not shown) of CPU 104 (FIG. 1) of computing system 102 (FIG. 1).

Process 300 starts in a "Begin Evaluate Line" block 302 and proceeds immediately to a "Process File References" block 304. During processing associated with block 304, a line that has been selected for processing (see 260 and 262, FIG. 4) is examined for any references to files, particularly files that are modified or deleted. The names of any referenced files and the proposed modifications are stored in temporary memory space. During processing associated with a "Process DLL References" block 306, the names of any referenced dynamic link libraries (DLLs) and the proposed modifications are stored in temporary memory space. During processing associated with a "Process Registry References" block 308, the names of any referenced registry entries and the proposed modifications are stored in temporary memory space. Finally, during processing associated with an "End Evaluate Line" block 319, process 300 is complete. It should be understood that blocks 304, 306 and 308 are examples of only three types of evaluation that may with respect to a software installation and that the claimed subject matter is equally applicable to other types of evaluation.

Figure 6:
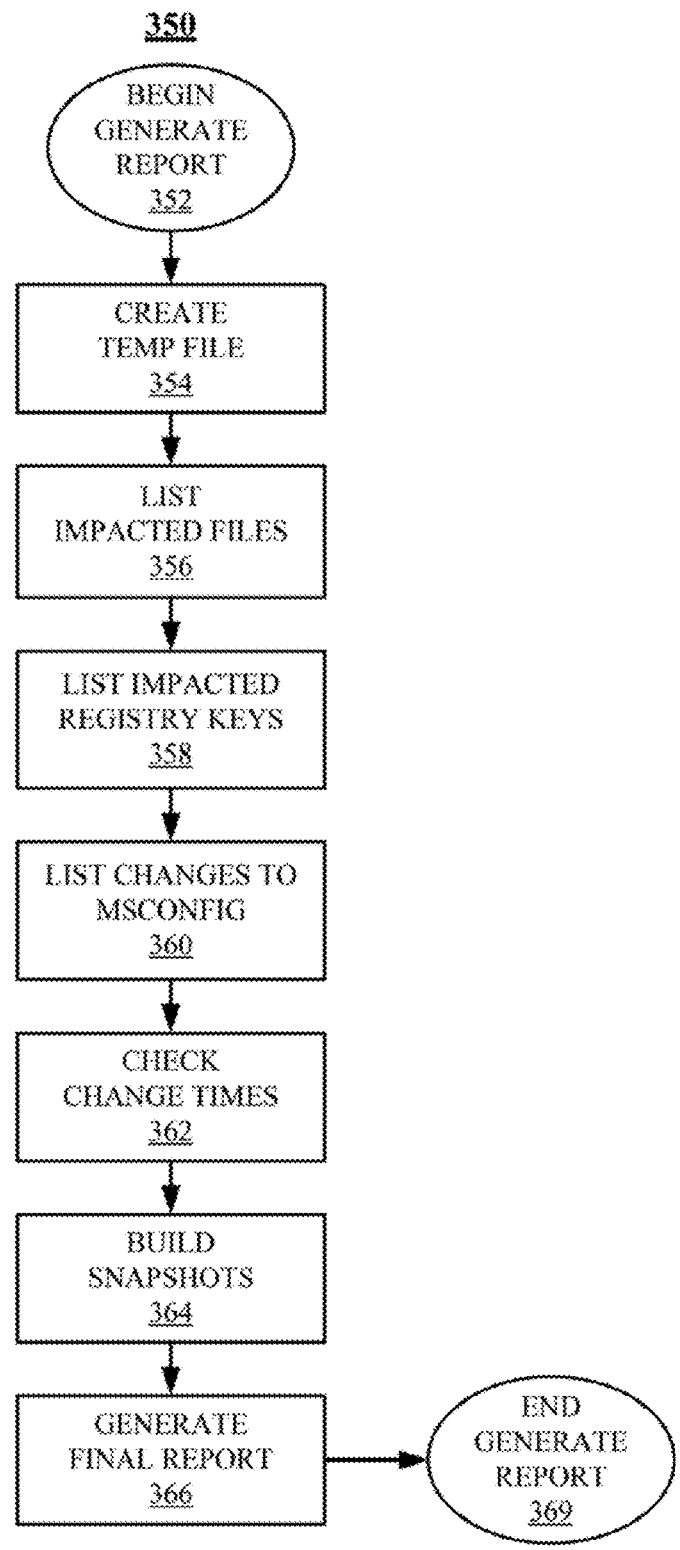
FIG. 6 is a flowchart on one example of a Generate Report process that may implement aspects of the claimed subject matter.

FIG. 6 is a flowchart on one example or a Generate Report process 350 that may implement aspects of the claimed subject matter. In this example, like processes 200, 250 and 300, logic associated with process 350 is stored on CRSM 112 (FIG. 1) as part of SIEP 118 (FIGS. 1 and 2) and execute on one or more processors (not shown) of CPU 104 (FIG. 1) of computing system 102 (FIG. 1).

Process 350 starts in a "Begin Generate Report" block 352 and proceeds immediately to as "Create Temp File" block 354. During processing associated with block 354, a temporary file is created to store intermediate results. During processing associated with a "List Impacted Files" block 356, any files that may be impacted by the software installation program being examined (see 304, FIG. 5) are stored to the temporary file created during processing associated with block 354. During processing associated with a "List Impacted Registry Keys" block 358, any registry keys that may be impacted by the software installation program being examined (see 308, FIG. 5) are stored to the temporary file created during processing associated with block 354. During processing associated with a "List Changes to MSConfig" block 369, any DLLs that may be impacted by the software installation program being examined (see 306, FIG. 5) are stored to the temporary file created during processing associated with block 354.

During processing associated with a "Check Change Times" block 362, a time stamp associated with each file, registry key or DLL that may be affected is noted. During processing associated with a "Build Snapshots" block 364, backups of all files, registry keys and DLLs that may be affected is stored in a temporary memory space (see 254, FIG. 4) for use in the event that the user decides at a later time to restore the system to a pre-software install configuration.

During processing associated with a "Generate Final Report" block 366, a report that details any potential changes to files, DLLs and registry keys is generated and presented to the so that the user may decide whether or not to proceed with the installation (see 212, FIG. 200). A "risk rating" may also be supplied in conjunction with a report. Such a rating would typically assign a "High," "Medium" or "Low" rating to the installation of the software depending upon an estimation of the potential number and severity of issues that may be encountered. In the alternative, a numerical risk rating may be assigned. The report may also include a listing of any files that might be affected by an installation so that a user may more easily reverse the installation if necessary. In addition, instructions may be provided for reversing the installation at a later time. Finally, during processing associated with an "End Generate Report" block 369, process 350 is complete.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method, comprising:
    downloading a software installation program on a computing system, wherein execution of the software installation program installs a computing product on the computing system;
    disassembling the software installation program to produce a plurality of lines of instructions;

analyzing each line of the plurality of lines of instructions to identify potential modifications to the computing system associated with the program;

generating a report detailing the potential modifications to the computing system; and displaying the report so that a user may evaluate an impact of the potential modifications to the computing system in the event the software installation program is executed;

wherein the potential modifications are associated with modifications to all the items from a list, the list consisting of:

dynamic link libraries (DLLs);
shared DLLs;
registry keys;
configuration information;
device drivers;
file modifications;
file deletions; and
installed programs.

2. The method of claim 1, farther comprising providing support for de-installing any software installed by the software installation program.

3. The method of claim 1, further comprising:

identifying each file of a plurality of files potentially affected by the software installation program; and including in the report a listing of each file potentially affected.

4. The method of claim 1, further comprising:

calculating a risk rating based upon an estimation of a number and severity of potential issues associated with the potential installation; and including the risk rating in the report.

5. The method of claim 1, wherein the computing product is an application.

6. The method of claim 1, wherein the computing product is an update to a computing product installed on the computing system.

7. An apparatus, comprising:

a processor;

a non-transitory, computer readable storage medium coupled to the processor; and logic, stored on the computer readable storage medium and executed on the processor, for:

downloading a software installation program on a computing system, wherein execution of the software installation program installs a computing product on the computing system;

disassembling the software installation program to produce a plurality of lines of instructions;

analyzing each line of the plurality of lines of instructions to identify potential modifications to the computing system associated with the program;

generating a report detailing the potential modifications to the computing system; and displaying the report so that a user may evaluate an impact of the potential modifications to the computing system in the event the software installation program is executed;

wherein the potential modifications are associated with modifications to all the items from a list, the list consisting of:

dynamic link libraries (DLLs);
shared DLLs;
registry keys;
configuration information;
device drivers;
file modifications;
file deletions; and
installed programs.

8. The apparatus of claim 7, the logic further comprising logic for providing support for de-installing any software installed by the software installation program.

9. The apparatus of claim 7, the logic further comprising logic for:

identifying each file of a plurality of files potentially affected by the software installation program; and including in the report a listing of each file potentially affected.

10. The apparatus of claim 7, the logic further comprising logic for:

calculating a risk rating based upon an estimation of a number and severity of potential issues associated with the potential installation; and including the risk rating in the report.

11. The apparatus of claim 7, wherein the computing product is an application.

12. The apparatus of claim 7, wherein the computing product is an update to a computing product installed on the computing system.

13. A computer programming product, comprising:

a non-transitory, computer readable storage medium; and logic, stored on the computer readable storage medium for execution on a processor, for:

downloading a software installation program on a computing system, wherein execution of the software installation program installs a computing product on the computing system;

disassembling the software installation program to produce a plurality of lines of instructions;

analyzing each line of the plurality of lines of instructions to identify potential modifications to the computing system associated with the program;

generating a report detailing the potential modifications to the computing system; and displaying the report so that a user may evaluate an impact of the potential modifications to the computing system in the event the software installation program is executed;

wherein the potential modifications are associated with modifications to all the items from a list, the list consisting of:

dynamic link libraries (DLLs);
shared DLLs;
registry keys;
configuration information:
device drivers:
file modifications;
file deletions; and
installed programs.

14. The computer programming product of claim 13, the logic further comprising logic for providing support for de-installing any software installed by the software installation program.

15. The computer programming product of claim 13, the logic further comprising logic for:

identifying each file of a plurality of files potentially affected by the software installation program; and including in the report a listing of each file potentially affected.

16. The computer programming product of claim 13, the logic further comprising logic for:

calculating a risk rating based upon an estimation of a number and severity of potential issues associated with the potential installation; and including the risk rating in the report.

17. The computer programming product of claim 13, wherein the computing product is an application.

* * * * *